April 11, 1939.  A. DORIN  2,154,326

MACHINE TOOL

Filed Sept. 27, 1937  4 Sheets-Sheet 1

Inventor:—
Anatol Dorin,
By:—Smith, Michael & Gardiner,
Attorneys.

April 11, 1939.  A. DORIN  2,154,326
MACHINE TOOL
Filed Sept. 27, 1937     4 Sheets-Sheet 2
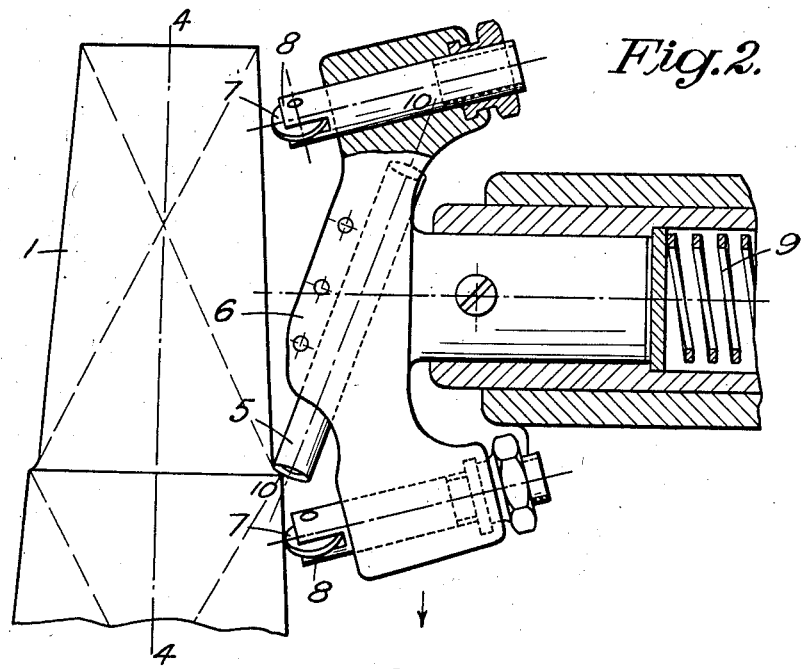
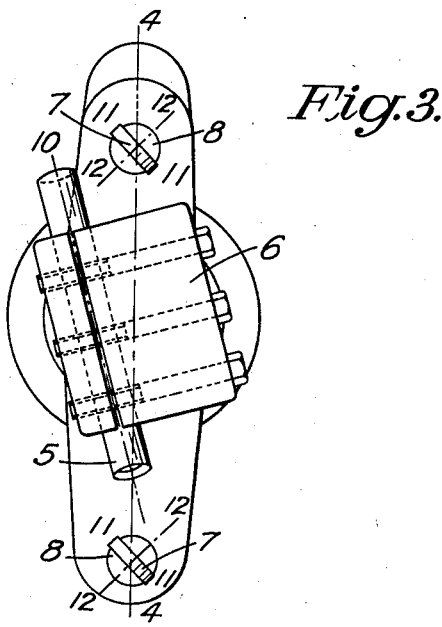
Inventor:-
Anatol Dorin,
By- Smith, Michael & Gardiner,
Attorneys.

April 11, 1939.  A. DORIN  2,154,326
MACHINE TOOL
Filed Sept. 27, 1937  4 Sheets-Sheet 3

Inventor:
Anatol Dorin,
By Smith, Michael & Gardiner,
Attorneys.

April 11, 1939.  A. DORIN  2,154,326
MACHINE TOOL
Filed Sept. 27, 1937    4 Sheets-Sheet 4

Inventor:-
Anatol Dorin,
By Smith, Michael & Gardiner,
Attorneys.

Patented Apr. 11, 1939

2,154,326

UNITED STATES PATENT OFFICE 2,154,326

MACHINE TOOL

Anatol Dorin, Prague, Czechoslovakia

Application September 27, 1937, Serial No. 165,973
In Czechoslovakia October 1, 1936

17 Claims. (Cl. 82—2)

This invention relates to machine tools for turning or rotary machining of work of non-circular cross-section, such as ingots and cast blocks, for example of pyramidal shape and square section.

The main objects of the invention are to avoid the difficulties encountered in turning work of this kind upon horizontal lathes, to reduce the floor-space occupied by the machine, to dispense with templates and copying devices by profiling directly according to the surface of the work, to maintain a substantially constant cutting angle for the tool, and to facilitate the mounting and centering of the work in the machine.

The invention is hereafter described with reference to the accompanying drawings, which illustrate by way of example, one embodiment of the present invention. In these drawings,—

Fig. 2 is a detail on a larger scale showing a tool-holder.

Fig. 3 is an elevation at right angles to Fig. 2.

The machines hitherto designed for machining ingots, cast blocks and other work of non-circular cross-section, have been exclusively of the type of horizontal lathes requiring very considerable floor-space. Such ingots or cast blocks, which when rotating in a horizontal position are subjected to an irregular rotary movement, cause considerable shocks and affect the output of the machine and the cutting capacity of the tools in a very detrimental manner.

This irregular rotary movement occurs only when turning blocks of non-circular cross-section and not in the case of turning operations on material of circular section; in the latter case, it is absolutely indifferent whether turning is done on horizontal or on vertical machines, whereas in the case of machining non-circular cross-sections of material there is an essential difference between machining on a horizontal lathe or machining on a vertical one, this difference resulting from the nature of the rotary movement of the work. This primary or rotary movement of non-circular work is irregular and jerky in the case of horizontal lathes and thereby affects in a detrimental manner both the output of the machine and the life of the cutting tools. Such horizontal lathes require excessive floor-space and much greater driving power which makes the use of these machines uneconomical.

All these drawbacks have been eliminated by the present invention which provides a novel arrangement for machining non-circular work, more particularly ingots. This arrangement is characterized in that the machining of non-circular work is effected directly at its rough surface, without the use of any template or copying device, and in a vertical position of the work, in such a manner that the work receives a rotary motion and the cutting tool receives the feed motion or travel.

Figure 1:
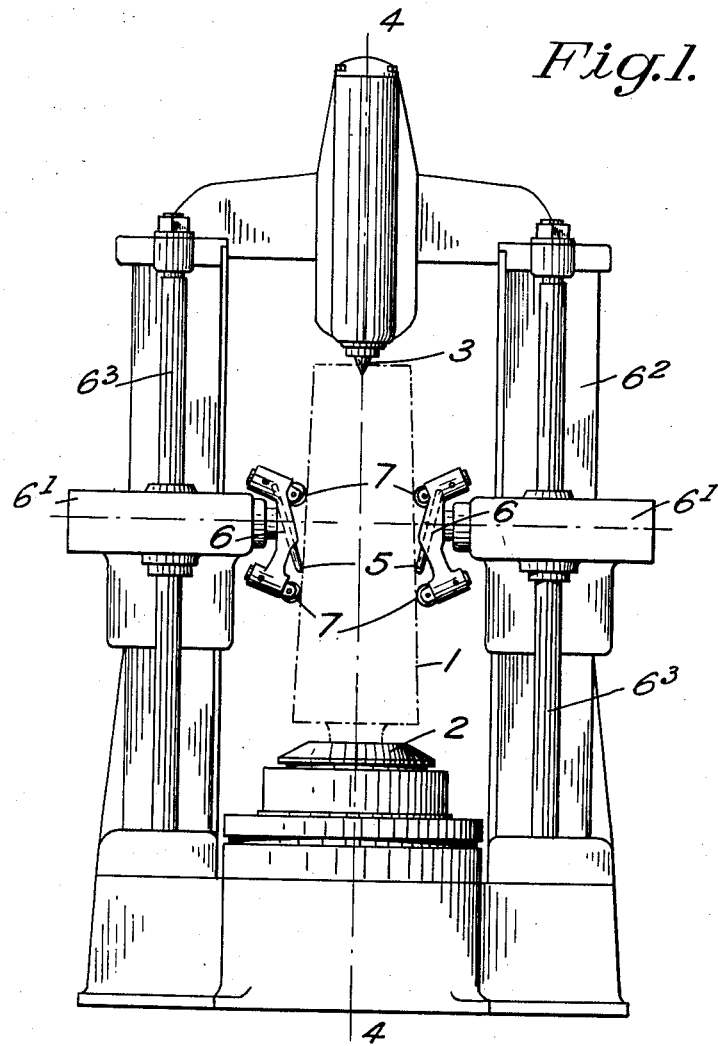
Fig. 1 is a front elevation of the improved machine.

Referring to Fig. 1, the work 1 is held between the lower clamping and driving means 2 and the upper fixed center 3. At every angular position the work 1 subjected to a rotary movement by the driving means 2, remains always in line with the axis 4—4 passing through its center of gravity. The cutting tools 5 are clamped in the tool holders 6 and guided by rollers 7 running on the rough surface of the work. The tool holders are carried by saddles 6¹ slidably guided on the side pillars 6² of the machine frame and receiving vertical movement from feed-screws 6³.

As can be seen, the design of the machine is very simple and the overall length is comparatively small, so that the machine requires but a small floor-space.

With such a method of machining, which enables the work to have the axis of its center of gravity always in a vertical position at every angular displacement, the operation is absolutely regular and free from shocks. This is very important not only for the output of the machine and for the preservation of the cutting tools, but equally important for the general arrangement and simple construction of the machine upon which the turning operation is carried out, as well as for saving floor-space and facilitating service by reason of the small overall length of the machine.

This means in any given case a novel working method offering numerous advantages in comparison with the hitherto known operations.

The hitherto known horizontal lathes for machining work of non-circular cross-section, more particularly ingots, which function in such a manner that profiling proceeds directly according to the surface of the work, present numerous drawbacks. The profiling method hitherto known in machining ingots consists in guiding the cutting tool by a device, for example a guide pulley touching the rough work surface, in such manner that the cutting tool and the guiding device are arranged perpendicularly to the axis of the work.

The tool carrier is arranged so as to be adjustable in relation to the work in a horizontal plane in the direction of the length of the axis of rotation and perpendicularly thereto, that is to say in the directions of the feed movement and of the thickness of the work respectively.

Since, in the case of non-circular ingots of a variable cross-section, the surfaces are not circular, but curved in any manner whatsoever or flat, and since the distance of these surfaces from the axis of rotation as regards the cutting edge of the tool changes at every angular displacement of the work, it is obvious that the angle of the cutting tool relatively to the work surface also changes. These changes of the cutting angle are repeated (for example four times) during every revolution of the work and attain a limit at angles of 60 to 150° relatively to the work surface; the preferable angle of top rake is 8 to 16° and it has been found that any other angle affects the output of the machine and also the quality of the cutting edge of the tool in a detrimental manner and thereby renders an economical working of the machine-tool impossible.

A further characteristic of the hitherto known machines for working ingots and profiling according to the rough surface of the ingot, is that the feeler attachment upon the tool slide contacts with the work in known manner by means of guide rollers, the axis of the work and the axes of the guide rollers being parallel and in the same plane with the point of the cutting tool. In such case sliding friction occurs on the surface of the ingot, causing an excessive wear of the guide rollers.

By a second feature of the present invention all the aforesaid drawbacks will be eliminated. This feature consists essentially in that the cutting tool, the longitudinal axis of which is inclined relatively to the axis of rotation of the work, is guided direct on the surface of the work, by means of a feeler device formed by two or more rollers, arranged in an inclined position relatively to the axis of the work. Thereby it will be attained that, on the one hand, the cutting angle of the tool remains always constant, and on the other hand, the guide rollers are subjected only to rolling friction. The cutting tool is, preferably, in the form of a steel bar of circular cross-section.

In Fig. 2, the square pyramidal ingot to be worked is indicated at 1. The tool holder 6 carrying the cutting tool 5 in the form of a round tube with counter-sunk or inwardly bevelled end, ground to form the cutting edge, is provided with two guiding forks 8, wherein the guide rollers 7 touching the work, are rotatably mounted. The tool holder 6 is urged against the work by means of a spring 9.

Machining of the ingot proceeds in the following manner:

One guide pulley 7 touches the rough surface of the ingot 1 and guides at the same time the cutting tool 5, which projects beyond the guide roller by a value corresponding to the depth of the cut, i. e. the thickness of the layer to be removed from the ingot 1.

As can be seen in Fig. 3, the axis 10—10 of the cutting tool 6 is inclined relatively to the axis 4—4 of the ingot, in such a manner that the cutting angle remains constant in any position during the rotary movement of the ingot.

Presuming that the work 1 is revolving and the tool holder 6 is sliding, the roller 7 is subjected to two force-components, i. e. the one arising from the rotary movement of the work and the other from the sliding movement of the tool holder. If the guide roller has only to be subjected to rolling friction, it must be placed in a direction representing the resultant of both these components. This resultant line is indicated by the direction 11—11, corresponding to a diameter of the guide roller 7, while the axis of the guide roller lies in a direction perpendicular to this line, i. e. at 12—12. As can be seen, both the axis 4—4 of the work and the axis 10—10 of the cutting tool are inclined relatively to the axis 12—12 of the guide roller.

As a guide roller or feeler for touching the rough surface of the work, a roller may be used which lies always in advance of the tool, in the direction of the sliding movement. If, in a given case, the direction of the sliding movement of the carriage is downwards, as indicated by the arrow in Fig. 2, the lower roller 7 touches the rough surface of the work. If the ingot has to be worked according to the profiling method down to the lower end, it is necessary to engage the other guide roller 7 into the working process, as soon as the lower roller reaches the bottom end of the ingot. In this manner it is possible, with the aid of the second guide roller, which touches the already worked surface of the ingot, to work down the still rough portion of the ingot, said portion corresponding to the distance between the cutting tool and the lower guide roller. In this manner it is attained, that by a mere profiling method, the whole ingot may be worked without the use of any former or copying device.

Another feature of the present invention relates more particularly to an arrangement of centering and driving devices for the work to be machined in a vertical position, this arrangement comprising a work-driving member movably supported on balls in relation to the rotary table of the machine.

It is a feature of the present invention that the work can be clamped direct in its working position on the holding table of the machine, thus eliminating the necessity of a sliding movement of these heavy masses, more particularly ingots, the weight of which may be up to several tons. For this purpose, the holding table will be arranged in its working position fixedly on the frame of the machine and only the top support carrying the fixed center is arranged slidably or pivotally at the top of the machine frame. Thereby the usual simplified main drive of the machine will be retained and the whole complicated arrangement of the drive for sliding the work-holding table together with the work will be replaced by a comparatively simple arrangement for a sliding or other displacement of the top support. Furthermore a more desirable work-holding arrangement can be provided, since the top support of the machine relieves the space above the holding table.

Figure 4:
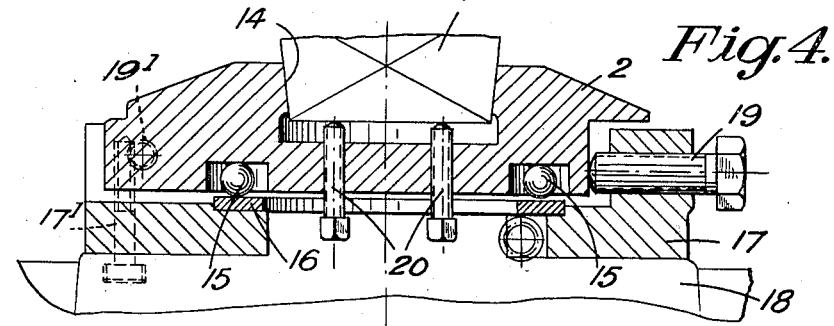
Figs. 4 and 5 show in sectional elevation two forms of construction of centering devices for the work-clamping and driving means.

Fig. 4 shows the lower clamping and driving means 2 provided with a centering device according to a first embodiment, the driver 2 having an opening 14 adapted to receive the work 1. This driver 2 is supported on balls 15 which in turn are supported on an annular disc 16. The disc 16 is held on a base plate 17 secured by screws 17¹ on to the rotary table 18 of the machine. By means of adjusting and regulating bolts 19, the driver 2 can be arranged adjusted and held in position upon the base plate 17, the rotary drive being transmitted by screws 19¹ as hereafter described with reference to Figs. 5 and 6.

Between the movable top part of the driver 2 and the disc 16 on the base plate there may be fitted any number of balls 15, which are arranged in such manner, that even the heaviest workpieces may be readily displaced in a radial direction, so that the work may be accurately centered by means of the adjusting bolts 19. The driver according to Fig. 4 is fixed onto the work, outside the machine, and is introduced simultaneously with the work into the base plate 17, so as to rest upon the balls 15; the driver 2 can also be withdrawn from the work, when removed from the machine, by means of pressure screws 20.

Figure 5:
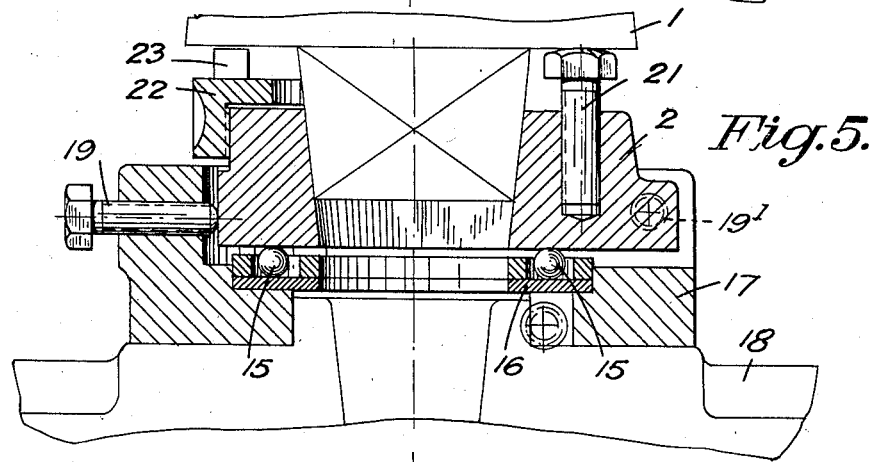
Figure 6:
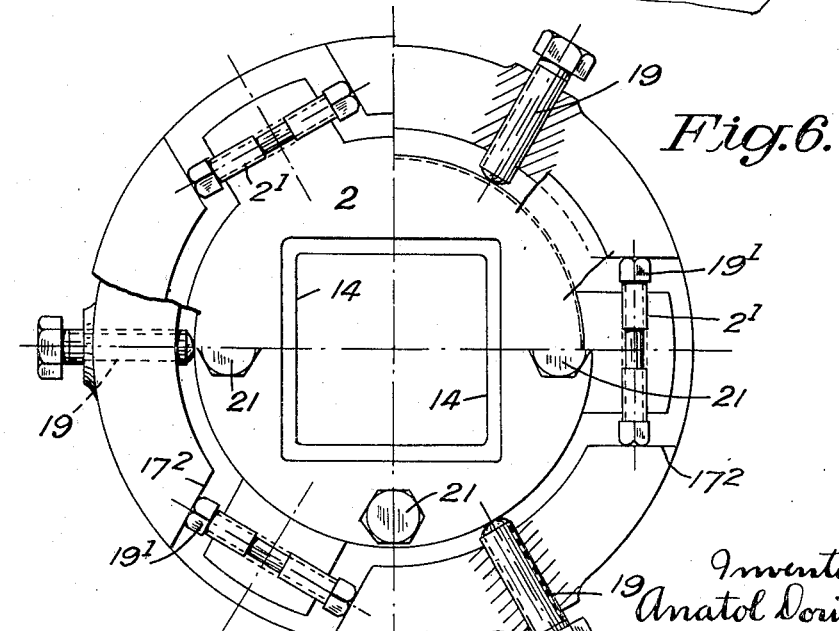
Fig. 6 is a plan of Fig. 5.

The modified form shown in Figs. 5 and 6 is substantially identical with that illustrated in Fig. 4, especially as far as carrying the weight of the work and easy centering are concerned, but differs from the first embodiment according to Fig. 4 by the fact that the driver 2 in this second embodiment, is permanently in place on the machine and the work, which is clamped in said driver, can be lifted by means of screws 21 (as indicated on the right of Fig. 5) or by means of a ring nut 22 and washers 23 (as indicated on the left), the ring nut being rotatable by a tangential worm (not shown).

Fig. 6 illustrates the arrangement of the workholding surfaces in the driver 2, the latter having a square opening 14 in the shape of a truncated cone. Furthermore, Fig. 6 shows the arrangement of the centering bolts 19 provided at the circumference of the base plate 17 of the driver, said bolts enabling the driver to be centered thereby also centering the work 1. The screws 19¹ for transmitting the drive are engaged in lugs 2¹ upon the driver 2, their heads engaging with abutments 17² on the rotary table; after the work has been centered on the machine, the screws 19¹ are adjusted to make contact with the abutments 17². The distance or lifting screws 21, upon which the work will be fitted, are indicated in the lower half of Fig. 6.

The above described centering and driving device offers, in contradistinction with the hitherto familiar designs, wherein the weight of the work impedes the proper adjustment thereof, the possibility of easy working and enables workpieces of various kinds to be readily and accurately centered regardless of their weight.

The top part of the machine, that is the top support with the fixed center can be displaced by a sliding or by a pivotal movement, for the more convenient clamping of the work on the holding table, and the movement can be produced by mechanical, hydraulic, pneumatic or electrical means.

Figure 7:
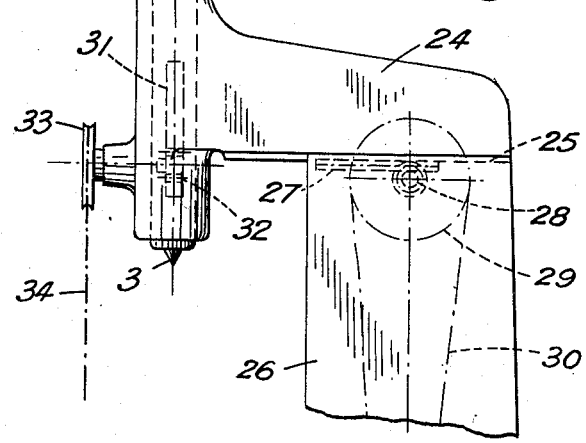
Figs. 7 and 8 illustrate diagrammatically two forms of removable head or support for centering the top end of the work, Fig. 7 being an elevation and Fig. 8 a sectional elevation.

Fig. 7 illustrates a mechanically slidable top support with fixed center 3. However, the removal of the top support away from the working position can be arranged in any other suitable manner, for example, by an angular displacement about a horizontal, vertical or inclined axis.

The top support 24 is guided in a slide 25 upon the machine frame 26 and can be moved along said slide by a horizontal movement. Said top support is provided with a rack 27 adapted to be displaced with a sliding movement by means of a gear 28, pulley 29 and cable 30 which may be operated either by hand or mechanically. In the same manner the fixed center 3 may be displaced either upwards or downwards by means of a rack 31, gear 32, pulley 33 and cable 34, operated either by hand or mechanically. Both movements, i. e. the horizontal movement of the top support 24 and the vertical movement of the fixed center 3, may be simultaneously controlled from one central point.

Figure 8:
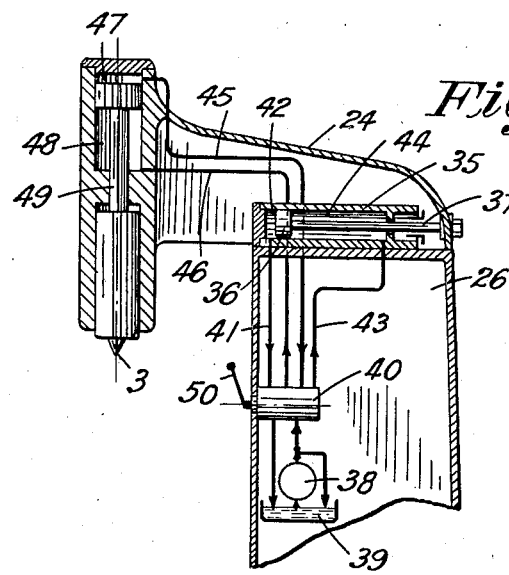

Fig. 8 shows the arrangement of a hydraulic control. On the machine frame 26 a hydraulic cylinder 35 is arranged wherein a piston 36 is slidable, said piston being fixedly connected in the given case to the top support 24 by a rod 37. Instead of arranging said hydraulic cylinder on the machine frame, it is possible to provide such cylinder in the top support 24; in this case the hydraulic cylinder is slidable in common with the top support 24 and the piston will be fixedly connected to the frame 26.

Through the medium of a hydraulic pump 38, the pressure liquid is drawn from the tank 39 and forced through a control valve 40 and pipe 41 into the pressure space 42 of the hydraulic cylinder 35. In this position, the pipe 43 operates as exhaust wherethrough the liquid is led through the valve 40 back into the tank 39. During this flow of the pressure liquid, the top support 24 is displaced to the right, the pressure liquid from the chamber 44 behind the piston escaping through the pipe 43. On the return movement of the top support 24 into the working position, the direction of flow of the pressure liquid is reversed, i. e. the pressure liquid comes through the pipe 43 into the hydraulic cylinder and from the other side of the piston it returns through the pipe 41 into the tank 39.

As is obvious from the drawings, the fixed center 3 may be approached to or removed from the work, in the same manner, the pressure liquid flowing in such case through the pipe 45 or 46 respectively into the upper pressure chamber 47 or lower pressure chamber 48 of the ram 49 carrying the fixed center 3.

Also in this case, the horizontal movements of the top support 24 and the vertical movements of the fixed center 3 may be controlled from the same point by means of the valve 40, which is operated by a handle 50.

What I claim is:

1. A machine tool for rotary machining of work of non-circular cross-section, comprising means for supporting and rotating the work upon a vertical axis, a cutting tool, resilient means for holding said cutting tool against the periphery of the work, means engaging with the surface of the work for limiting the movement of said cutting tool towards said axis, and means for feeding said cutting tool and said surfacing engaging means along the work during operation of said cutting tool.

2. A machine tool for rotary machining of work of non-circular cross-section, comprising means for supporting and rotating the work upon a vertical axis, a cutting tool, a guide roller, said guide roller having its axis inclined relatively to said vertical axis, a movable support common to said cutting tool and guide roller, resilient means for holding said cutting tool and guide roller against the periphery of the work, and means for feeding said cutting tool and guide roller along the work during operation of said cutting tool.

3. A machine tool for rotary machining of work of non-circular cross-section, comprising means for supporting and rotating the work upon a vertical axis, a cutting tool, a pair of guide rollers, said guide rollers having their axes inclined relatively to said vertical axis, a movable support common to said cutting tool and guide rollers, resilient means for bringing said support towards said axis so as to hold said cutting tool and at least one of said guide rollers against the periphery of the work, and means for feeding said support in a direction substantially parallel to said axis.

4. A machine tool for rotary machining of work of non-circular cross-section, comprising a frame, a rotary work table, a center mounted on said frame in vertical alignment with said table, said center adapted to steady a piece of work secured on said table, a pair of cutting tools movably supported on said frame at opposite sides of the work, resilient means for holding said cutting tools against the periphery of the work, means engaging with the surface of the work for limiting the movement of said cutting tools towards said axis, and means for feeding said cutting tools and said surface engaging means along the work during operation of said cutting tools.

5. In a machine tool for rotary machining of work of non-circular cross-section, with the work rotating on a vertical axis and a cutting tool fed along the work, a tool support comprising a member slidable in a horizontal direction substantially radial of said axis, means for clamping a cutting tool upon said member, a pair of guide rollers mounted on said member and resilient means for sliding said member towards said axis, said guide rollers having their axes inclined to said vertical axis and being adapted to engage with the periphery of the work in substantially the same vertical line as said cutting tool.

6. In a machine tool for rotary machining of work of non-circular cross-section, with the work rotating on a vertical axis and a cutting tool fed approximately parallel to said axis, a tool support comprising a member slidable in a horizontal direction substantially radial of said axis, means for clamping a cutting tool upon said member with the length of said tool inclined relatively to said axis, a pair of guide rollers mounted on said member with the axes of said rollers inclined relatively to said axis, and resilient means for sliding said member towards said axis, said guide rollers being adapted to engage with the periphery of the work in substantially the same vertical line as said cutting tool.

7. In a machine tool for rotary machining of work of non-circular cross-section, with the work rotating on a vertical axis and a cutting tool fed approximately parallel to said axis, a tool support comprising a member slidable in a horizontal direction substantially radial of said axis, means for clamping a cutting tool upon said member with the length of said tool inclined relatively to said axis, a pair of guide rollers mounted on said member, one of said rollers being above and the other below said cutting tool, the axes of said rollers being inclined at the same angle relatively to said axis, and resilient means for sliding said member towards said axis to hold said cutting tool and at least one of said rollers against the periphery of the work.

8. In a machine tool for rotary machining of work of non-circular cross-section, with the work rotating on a vertical axis and a cutting tool fed approximately parallel to said axis, a tool support comprising a member slidable in a horizontal direction substantially radial of said axis, means for clamping a cutting tool upon said member with the length of said tool inclined relatively to said axis, a pair of guide rollers mounted on said member, one of said rollers being above and the other below said cutting tool, the axes of said rollers being inclined at the same angle relatively to said axis, and resilient means for sliding said member towards said axis to hold said cutting tool and at least one of said rollers against the periphery of the work, said angle being such that said one roller rolls upon said periphery without relative sliding movement and said angle being different from the angle of inclination of said tool relative to said axis.

9. In a machine tool for rotary machining of work of non-circular cross-section, with the work rotating on a vertical axis and a cutting tool fed approximately parallel to said axis, a rotary table supporting the lower end of the work and comprising a driving member having a cavity in positive engagement with the work, anti-friction means supporting said driving member and work upon a horizontal surface of said table, and means for adjusting said driving member radially of said surface for bringing the work into line with the axis of rotation of said table.

10. In a machine tool for rotary machining of work of non-circular cross-section, with the work rotating on a vertical axis and a cutting tool fed approximately parallel to said axis, a rotary table supporting the lower end of the work and comprising a driving member having a cavity in positive engagement with the work, a disc engaged in said table, balls resting on said disc and supporting said driving member and work, and adjusting bolts arranged in radial positions on said table and engaging with said driving member for centering the work upon said table.

11. In a machine tool for rotary machining of work of non-circular cross-section, with the work rotating on a vertical axis and a cutting tool fed approximately parallel to said axis, a rotary table supporting the lower end of the work and comprising a driving member having a cavity in positive engagement with the work, anti-friction means supporting said driving member and work upon a horizontal surface of said table, means carried by said driving member for lifting the work out of said cavity, and means for adjusting said driving member upon said anti-friction means for centering the work upon said table.

12. In a machine tool for rotary machining of work of non-circular cross-section, with the work rotating on a vertical axis and a cutting tool fed along the work, a rotary table supporting the lower end of the work and comprising a driving member having a cavity in positive engagement with the work, and means for centering the lower end of the work in relation to said axis, a center for the upper end of the work, a top support for said center, said top support being carried by the frame of the machine and displaceable relatively to said axis, and means for displacing said center in two directions (vertical and horizontal) in relation to said axis.

13. In a machine tool for rotary machining of work of non-circular cross-section, with the work rotating on a vertical axis and a cutting tool fed along the work, a rotary table supporting the lower end of the work and comprising a driving member having a cavity in positive engagement with the work, and means for centering the lower end of the work in relation to said axis, a center for the upper end of the work, a top support for said center, said top support being slidable horizontally upon the frame of the machine and means for sliding said top support to remove said center from said axis.

14. In a machine tool for rotary machining of work of non-circular cross-section, with the work rotating on a vertical axis and a cutting tool fed approximately parallel to said axis, a rotary table supporting the lower end of the work and comprising a driving member having a cavity in positive engagement with the work, and means for centering the lower end of the work in relation to said axis, a center for the upper end of the work, a top support for said center, said center being displaceable vertically, said top support being carried by the frame of the machine and displaceable relatively to said axis, a horizontal rack fast with said top support, a gear mounting on said frame and engaging with said rack, and means for rotating said gear to displace said top support horizontally in relation to said axis.

15. In a machine tool for rotary machining of work of non-circular cross-section, with the work rotating on a vertical axis and a cutting tool fed approximately parallel to said axis, a rotary table supporting the lower end of the work and comprising means for centering the work thereon and a driving member having positive engagement with the work, a center for the upper end of the work, said center being displaceable vertically, a top support for said center, said top support being carried by the frame of the machine and displaceable horizontally relatively to said axis, and hydraulic means for displacing said top support to remove said center from said axis and to return said center to said axis for operation of the machine.

16. In a machine tool for rotary machining of work of non-circular cross-section, with the work rotating on a vertical axis and a cutting tool fed approximately parallel to said axis, a rotary table supporting the lower end of the work and comprising a driving member having a cavity in positive engagement with the work, means for centering the work upon said table, a center for the upper end of the work, a top support for said center, said top support being carried by the frame of the machine and displaceable relatively to said axis, said center being displaceable vertically, means for displacing said top support horizontally to remove said center from said axis and to return said center to said axis, and means for displacing said center vertically to engage said center with the work and to disengage said center from the work, both said displacing means being controlled from one point.

17. A machine tool for rotary machining of ingots of non-circular cross-section, comprising means for supporting and rotating the work upon a vertical axis, a cutting tool, means for feeding said cutting tool along the work during operation of said machine tool, and means engaging with the unmachined surface of the work for controlling the distance of said cutting tool from said axis so as to produce by direct copying of the non-circular cross-section a product of smaller but similar non-circular cross section.

ANATOL DORIN.